J. A. HARDY.
FLY TRAP.
APPLICATION FILED SEPT. 6, 1917.
1,260,897.
Patented Mar. 26, 1918.
2 SHEETS—SHEET 1.
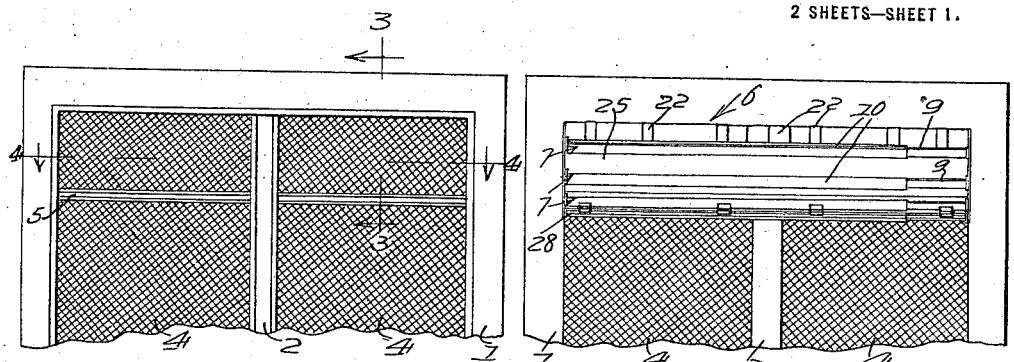
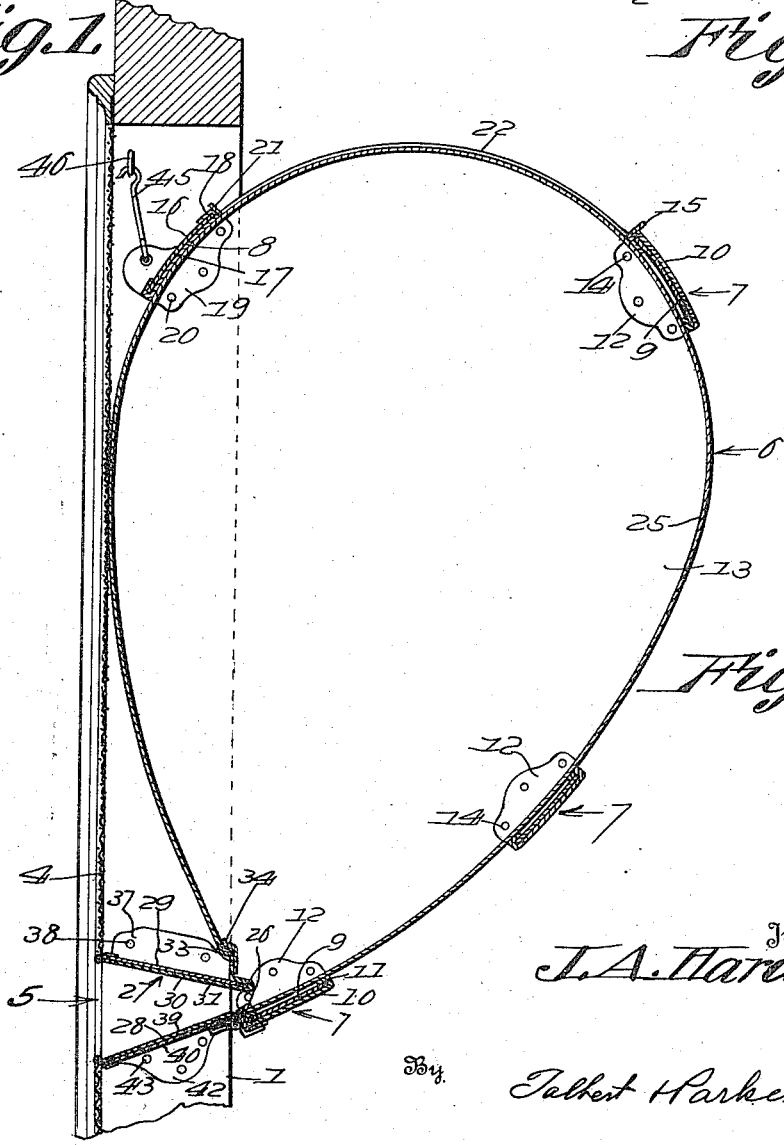
Inventor
J. A. Hardy,
By Talbert Harker
Attorneys J. A. HARDY.
FLY TRAP.
APPLICATION FILED SEPT. 6, 1917.
1,260,897.
Patented Mar. 26, 1918.
2 SHEETS—SHEET 2.
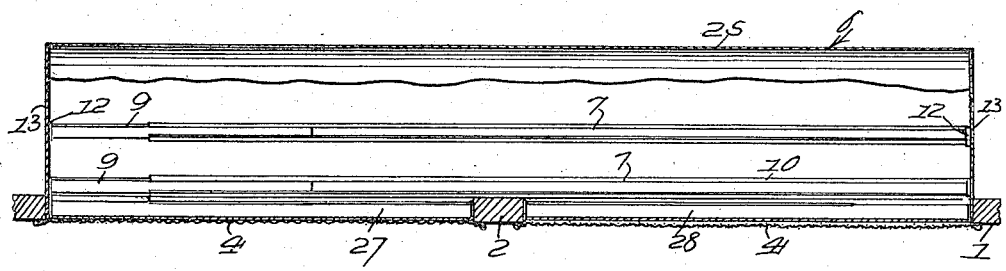
Fig. 4.
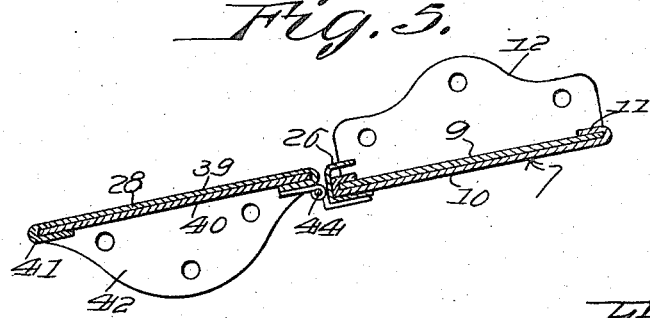
Fig. 5.
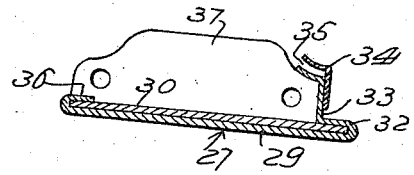
Fig. 6.
Fig. 7.
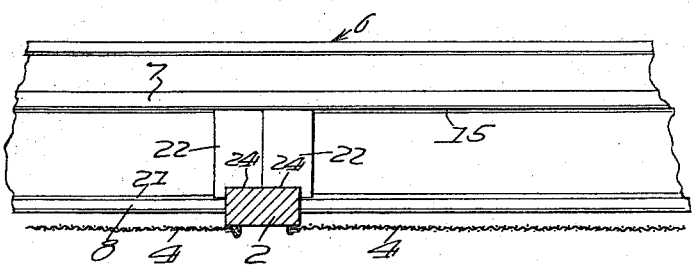
Inventor
J. A. Hardy,
By Talbert & Parker
Attorney

UNITED STATES PATENT OFFICE.

JOSHUA A. HARDY, OF EMPORIA, KANSAS.

FLY-TRAP.

1,260,897. Specification of Letters Patent. Patented Mar. 26, 1918.

Application filed September 6, 1917. Serial No. 190,019.

*To all whom it may concern:*

Be it known that I, JOSHUA A. HARDY, a citizen of the United States of America, residing at Emporia, in the county of Lyons and State of Kansas, have invented certain useful Improvements in Fly-Traps, of which the following is a specification, reference being had therein to the accompanying drawing.

The present invention relates broadly to improvements in fly traps and more particularly has reference to a fly trap especially designed for use in conjunction with a screen door.

It is the primary aim and object of this invention to provide a device of the above character designed for attachment to the inner surface of a screen door behind an opening in the screen door for trapping the flies that pass through the opening.

As an equally important object this invention embraces the provision of a fly trap, wherein pieces of fly paper, forming a part of the trap, are movably supported in the drum like frame so that the flies subsequent to passing through the opening in the door will engage the sticky surface of the paper and be prevented from escaping from the trap.

More particularly this invention includes the provision of a fly trap the frame of which is secured in sections relatively adjustable in order that the trap may be effectively connected to that type of screen door having a vertical bracing bar therein, when desired, or else the trap may be readily connected to the screen doors which are not provided with the bracing bar.

Among the other aims and objects of this invention may be recited the provision of a device of the character described with a view to compactness, and in which the number of parts are few, the construction simple, the cost of production low and the efficiency high.

Other improvements and novel details in the construction and arrangement of the various parts of the apparatus will be brought out more in detail in the description to follow, which for a clear understanding of the invention should be considered in connection with the accompanying drawings forming a part hereof, and wherein is disclosed for the purpose of illustration a convenient and satisfactory embodiment of the invention. It is to be noted in this connection that minor changes in the construction and arrangement of parts may be made without departing from the principle of operation of the various parts.

The invention is clearly illustrated in the accompanying drawings, in which:—

Figure 1 is a front elevation of a screen door showing the invention applied thereto;

Fig. 2 is a rear elevation of a screen door showing the invention in position thereon;

Fig. 3 is a transverse sectional detail taken on line 3—3, Fig. 1, in the direction in which the arrows point;

Fig. 4 is a horizontal section taken on line 4—4, Fig. 1, in the direction in which the arrows point;

Fig. 5 is a transverse sectional detail taken through the relatively adjustable sections of one of the strips;

Fig. 6 is still another detail;

Fig. 7 is a fragmentary plan detail.

Similar characters of reference are employed in all the above described views, to indicate corresponding parts.

Referring now, more particularly, to the accompanying drawings, there is provided a screen door consisting of a door frame 1 of a rectangular configuration being provided with a vertical bracing bar 2 in the sides thereof and to which sides the bar is connected. A piece of screen 4 provided adjacent its upper end with a transverse opening 5 and through which flies are adapted to pass and enter the improved fly trap indicated in its entirety by the numeral 6 is mounted in the inner surface of the door.

In the present instance the trap may be said to consist of a drum-like frame embodying a plurality of strips 7 and 8. The strips 7 are constructed in two sections 9 and 10 both of which are arcuate in cross section while the latter is provided with flanges 11 along its opposite marginal edges for slidably and adjustably accommodating the section 9. The outer ends of the sections 9 and 10 are formed with right angularly extending flanges 12 which are designed for attachment to end plates 13 of a substantitlly semi-circular configuration through the instrumentality of suitable fastening devices 14. Flange strips 15 are rigidly connected longitudinally of the sections 9 and 10 on the outer surfaces thereof adjacent the marginal edges for a purpose that will presently appear. The strip 8 is also formed in two parts and each part is formed in sections 16 and 17, the latter having flanges 18 formed on its marginal edges for slidably receiving the adjustable section 16 while the outer ends of the sections 16 and 17 are formed with right angularly extending flanges 19 designed for attachment to the adjacent end plates through the instrumentality of suitable fastening devices 20. It is of course to be appreciated that the section 16 of each part have their free ends suitably spaced from each other and designed for engagement with the opposite sides of the bracing bar 2 when the device is in a closed position against the inner surface of the screen door in a manner that will hereinafter become apparent. The flange strips 21 similar in construction to the flange strips 15 are connected to the outer surfaces of the sections 16 and 17 as indicated in the drawings for a purpose that will presently appear.

In order to increase the rigidity of the frame braces 22 are employed these braces being of different lengths but are each curved arcuately longitudinally and terminate at their respective ends in internal flanges 23 designed for slidable engagement with the adjacent flange strips 15 and 21 between the strips 7 and 8 as indicated in the drawings.

In this connection it is to be observed that the braces 22 between the strip 8 and the adjacent strip 7 are recessed on the adjacent upper edges as indicated by the numeral 24 in order that they may be accommodated about the bracing bar 2 on the screen door. It is to be appreciated that the braces serve to prevent sagging of the strips.

With a view toward providing suitable means in the frame forming a part of the trap for preventing the escape of flies therefrom, pieces of fly paper 25 are mounted in the frame so that the sticky surfaces thereof will be arranged to engage any flies that enter the trap. The lower edges of the sheets 25 are supported in the frame through the instrumentality of flanges 26 mounted on the outer marginal edges of the sections 9 and 10 of the lower strip 7, as indicated in Fig. 3.

With a view toward providing improved means for supporting the trap from the inner surface of the door, and for assuring of the guiding of the flies and the like into the body of the trap, strips 27 and 28 are employed. The strip 27 is formed in two parts and each part is constructed in relatively adjustable sections 29 and 30. In cross section each section 29 and 30 consists of a base portion 31 on the outer edge of which is formed an internal flange 32 from which projects an upright flange 33 while secured to the outer surface of the upright flange 33 is a flange strip 34 which coöperates with the upright flange in forming a groove 35 for a purpose that will hereinafter become apparent. In this connection it is to be observed, however, that the adjacent end of section 30 is cut away to leave only the base portion which is slidably engageable with the base portion of the section 29 between the flange 32 and the base portion and between the flange guide 36 formed on the inner marginal edge of the section 29, as indicated. The opposite ends of the sections 29 and 30 are formed with upwardly extending attaching flanges 37 which are connected to the opposed faces of the sides of the frame and the sides of the vertical bracing bar through the medium of suitable fastening devices 38, as indicated. The strip 28 is also formed in two parts while each part is composed of sections 39 and 40. The section 39 is formed on its marginal edges with flanged guides 41 for facilitating relative sliding connection between the sections 39 and 40 while the outer ends of each of these sections are formed with depending flanges 42 which are secured to opposed faces of the sides of the frame and the side edges of the vertical bracing bar through the instrumentality of suitable fastening devices 43. In securing the strips 27 and 28 it is to be observed that they are fastened directly in the rear of the opening 5 in the screen and are inclined toward each other as indicated in Fig. 3 and coöperate with this opening in forming an entrance to the body or frame of the trap which is pivotally connected to the strip 28 preferably through the instrumentality of hinges 44 the leaves of which are respectively carried by the adjacent outer surfaces of the sections 9 and 10 of the lower strip 7 and to the outer surfaces of the sections 39 and 40 of the strip 28 as indicated. When the trap is swung up into a closed position as indicated in Fig. 3, the outer edges of the fly paper are arranged in the groove 35 formed by the flange 34. Suitable means such as a hook 45 pivotally connected to one section of the strip 8 and designed for removable engagement with an eye 46 carried by the adjacent surface of the bar 2 may be employed for removably holding the trap in its uppermost position. It is of course to be appreciated that to remove the fly trap it is only necessary to unlatch the hook and swing the same upwardly to permit of the removal of the old paper and the insertion of new pieces of paper.

In use, assuming that the device has been assembled in the manner indicated, in Fig. 3, flies on the outside of the screen will pass through the opening 5 and through the entrance formed by the strips 27 and 28 and out of the interior of the frame or body whereupon when they engage the sticky surface of the fly paper 25 they will be prevented from escaping. Of course the new paper may be inserted when desired as is apparent. It is to be appreciated however, that if the device is attached to a screen door that is not provided with a vertical bracing bar the adjacent flanges of the adjacent parts of the strips 8, 27 and 28 may be connected to each other instead of being connected to the door as will be apparent.

It is believed that in view of the foregoing description a further detailed description of the operation of the invention is entirely unnecessary. Likewise it is believed that the advantages of the invention will be readily apparent.

As many changes could be made in the above construction and many apparently widely different embodiments of this invention could be made without departing from the scope thereof and it is intended that all matter contained in the above description or shown in the accompanying drawings shall be interpreted as illustrative and not in a limited sense. It is also to be understood that the language used in the following claims is intended to cover all the generic and specific features of the invention herein described and all statements of the scope of the invention which as a matter of language might be said to fall therebetween.

Having thus described my invention what I claim as new and desire to secure by Letters Patent is:—

1. A fly trap for screen doors consisting of a frame composed of relatively adjustable strips, flanges on the outer ends of the strips, end plates carried by the flanges, means on one of the strips for retaining pieces of fly paper within the frame so as to completely close the frame, other relatively adjustable strips connected to the door and the rear of an opening therein and constituting an entrance, means for pivotally connecting the lowermost strip of the frame to the lowermost strip of the door, means on the uppermost strip for accommodating the free edges of fly paper adapted to be received in the body, and means for removably holding the frame in a raised position against the inner surface of the door.

2. The combination with a screen door having an opening therein, of relatively adjustable strips connected to the door on the inner surface thereof in the rear of an opening inclined toward each other to coöperate with the opening for forming an entrance, a frame swingingly connected to the lowermost strip on the door and adapted to receive pieces of fly paper, means on the frame for facilitating the detention of the paper, means on the strip of the door for facilitating the detention of the paper in the frame, and means for removably holding the frame in a closed or raised position against the door.

3. The combination with a screen door having an opening therein, of a pair of relatively adjustable strips secured to the inner surface of the door adjacent the outer and lower edges of the opening and inclined toward each other and forming an entrance for the trap, a frame swingingly connected to the lowermost strip and adapted to receive pieces of fly paper for completely closing the frame, and means for removably holding the frame in a closed position.

4. The combination with a screen door having an opening therein, of a pair of strips secured to the inner surface of the door adjacent the upper and lower edges of the opening, each of the strips being formed of relatively adjustable sections so as to be readily accommodated on doors of various sizes, a frame consisting of relatively adjustable strips and end plates and adapted to receive pieces of fly paper so as to completely close the frame, means for swingingly connecting the frame to the lowermost strip of the door, and means for removably holding the door in a closed position.

5. The combination with a screen door having an opening therein, and formed with a vertical bracing bar intersecting the opening, of strips formed in two parts and each part composed of relatively adjustable sections, means for securing the sections of each part of the strips on the inner surface of the door upon opposite sides of the bracing bar and adjacent the upper and lower edges of the opening, the upper and lower strips being inclined toward each other, a frame composed of relatively adjustable strips and end plates connected to the outer ends of the strips, the frame being adapted to receive pieces of fly paper for closing the same, braces adjustably engaged on the adjacent strips for preventing sagging thereof, means for pivotally connecting the lowermost strip of the frame to the sections of the lowermost strips of the door, and means for removably holding the frame in a closed position.

In testimony whereof I affix my signature.

JOSHUA A. HARDY.

Copies of this patent may be obtained for five cents each, by addressing the "Commissioner of Patents, Washington, D. C."